United States Patent [19]
Alper

[11] Patent Number: 5,670,179
[45] Date of Patent: Sep. 23, 1997

[54] VALVE FOR CLOSING CAVITIES WHICH ARE TO BE FOAM-FILLED

[75] Inventor: Edmund Alper, Lohmar, Germany

[73] Assignee: Maschinenfabrik Hennecke GmbH, Leverkusen, Germany

[21] Appl. No.: 603,048

[22] Filed: Feb. 16, 1996

[30] Foreign Application Priority Data

Feb. 21, 1995 [DE] Germany .................. 195 05 937.9

[51] Int. Cl.$^6$ .................................................. B29C 45/18
[52] U.S. Cl. ..................... 425/4 R; 425/562; 425/564; 425/817 R
[58] Field of Search .......................... 425/4 R, 559, 425/560, 561, 562, 563, 564, 817 R

[56] References Cited

U.S. PATENT DOCUMENTS

| | | |
|---|---|---|
| 4,155,374 | 5/1979 | Diehl. |
| 4,240,999 | 12/1980 | Decker, Jr. . |
| 5,098,267 | 3/1992 | Cheng ................................ 425/559 |
| 5,106,283 | 4/1992 | Sauer et al. ........................ 425/564 |
| 5,178,184 | 1/1993 | Skillman . |
| 5,380,186 | 1/1995 | Hettinga et al. ................... 425/561 |

FOREIGN PATENT DOCUMENTS

| | | |
|---|---|---|
| 289764 | 11/1988 | European Pat. Off. . |
| 341428 | 11/1989 | European Pat. Off. . |
| 3815961 | 11/1989 | Germany . |
| 1214548 | 12/1970 | United Kingdom . |

Primary Examiner—Jay H. Woo
Assistant Examiner—Minh-Chau T. Pham
Attorney, Agent, or Firm—Joseph C. Gil; Noland J. Cheung

[57] ABSTRACT

A valve for use in introducing a foamable reactive mixture into a cavity, with the valve being of such size that it can be positioned within the cavity and when so-positioned is in contact with at least one of the walls of the cavity, with the valve including:

a) two essentially rotationally symmetrical coaxial cages, with said coaxial cages being spaced from each other, with the inner cage;
  i) having an axial opening for the introduction of the reactive mixture and at least two radial openings for the passage of the reactive mixture into the annular space formed between the inner and the outer cage;
  ii) having a ball, capable of moving freely within said inner cage and capable of closing the inlet opening following completion of the introduction of the reactive mixture; iii) having a convex surface opposite said inlet opening, with said convex surface being directed inward, so that during the introduction of the reactive mixture the ball assumes a position outside the inner cage axis; and b) with said outer cage having at least one radial opening for the passage of the reactive mixture from said annular space to said cavity, with the sizes of said axial opening and said radial openings being such that
  1) the total cross-sectional area defined by all of the radial openings in said inner cage is at least twice the cross-sectional area defined by said axial opening; and 2) the total cross-sectional area defined by all of the radial openings in said outer cage is at least twice the total cross-sectional area defined by all of the radial openings in said inner cage.

3 Claims, 2 Drawing Sheets

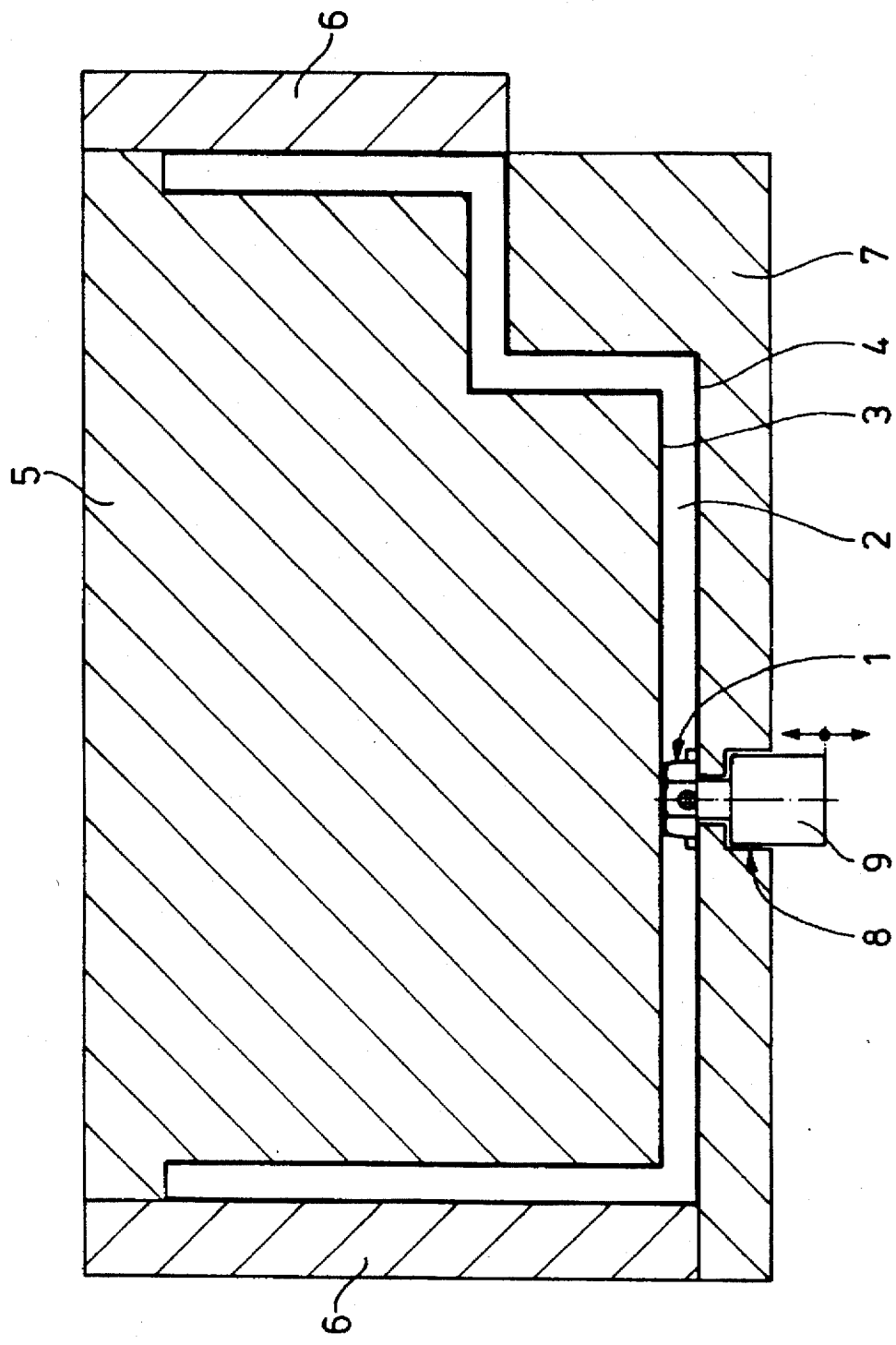

5,670,179

VALVE FOR CLOSING CAVITIES WHICH ARE TO BE FOAM-FILLED

BACKGROUND OF THE INVENTION

The present invention relates to a valve for use in introducing a foamable reactive mixture into cavities, particularly refrigerator casings, and in closing the cavities following introduction of the foamable reactive mixture.

Valves for such use are known and are described in published European patent application 289,764.

Such valves typically have a multiple function. They serve to create a laminar flow characteristic and reduce the rate of flow of the reactive mixture injected into the cavity at high speed, so that the reactive mixture can spread evenly within the cavity without causing undesirable gas pockets.

BRIEF DESCRIPTION OF THE DRAWINGS

FIG. 1 shows, in schematic form, the arrangement for foam-filling of a refrigerator casing.

DESCRIPTION OF THE INVENTION

Figure 4:
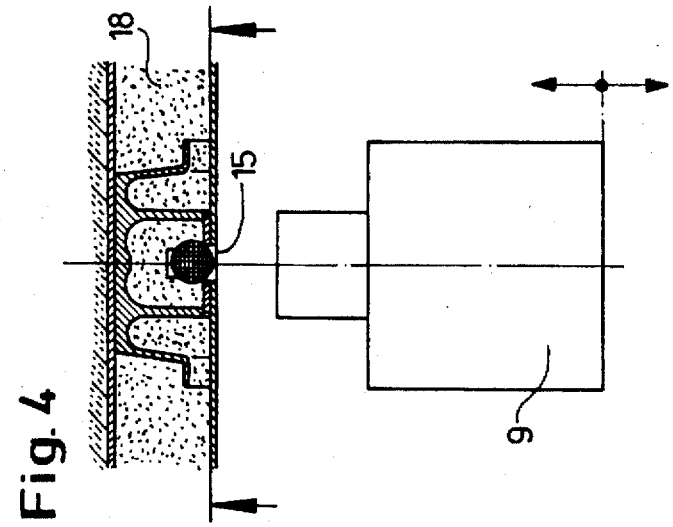
FIGS. 2, 3 and 4 show an axial cross-section through the valve according to the invention, in three different operating states.

The present invention is directed to a valve for use in introducing a foamable reactive mixture into a cavity, with the valve being of such size that it can be positioned within the cavity and when so-positioned being in contact with at least one of the walls of the cavity, with the valve comprising:

a) two essentially rotationally symmetrical coaxial cages, with said coaxial cages being spaced from each other, with the inner cage
  i) having an axial opening for the introduction of the reactive mixture and at least two radial openings for the passage of the reactive mixture into the annular space formed between the inner and the outer cage;
  ii) having a ball, capable of moving freely within said inner cage and capable of closing the inlet opening following completion of the introduction of the reactive mixture;
  iii) having a convex surface opposite said inlet opening; with said convex surface being directed inward, so that during the introduction of the reactive mixture the ball assumes a position outside the inner cage axis; and b) with said outer cage having at least one radial opening for the passage of the reactive mixture from said annular space to said cavity, with the sizes of said axial opening and said radial openings being such that
  1) the total cross-sectional area defined by all of the radial openings in said inner cage is at least twice the cross-sectional area defined by said axial opening and
  2) the total cross-sectional area defined by all of the radial openings in said outer cage is at least twice the total cross-sectional area defined by all of the radial openings in said inner cage.

The total cross-sectional area defined by all the radial openings of the inner cage is preferably two to six times the cross-section area defined by the axial opening. The total cross-sectional area defined by all the radial openings of the outer cage is preferably two to eight times the cross-sectional area defined by all of the radial openings of the inner cage, and preferably four to eight times.

The radial openings of the inner cage and outer cage are preferably disposed so that the reactive mixture flows through the latter with at least two deflections.

The deflection of the flow within the annular space between the cages and the simultaneous enlargement of the cross-section of the radial openings of the outer cage effectively reduces the turbulence and at the same time reduces the flow rate in the flowing reactive mixture.

According to a particularly preferred embodiment of the invention, the radial openings of the outer cage are formed as flow channels whose length in the direction of flow is at least equal to their shortest cross-sectional dimension.

FIG. 1 shows a valve 1 according to the invention, which is disposed within the cavity 2 between the inner casing 3 and the outer casing 4 of a refrigerator. For the purpose of preventing deformation of the refrigerator casing 3, 4 by the foam pressure produced during foam-filling, the refrigerator casing is placed in a support casing (or mold) in the known manner, consisting of support core 5, side plates 6 and a base plate 7 which are capable of withstanding the foam pressure. The base plate 7 has an opening 8 through which is inserted the mixing head 9 in which the components of the reactive mixture to be foamed are mixed, the mixing head being pressed against the valve inlet opening. A foamable polyurethane reactive mixture is preferably used for foaming. The technique for producing foamable polyurethane reactive mixtures is known in the art (see Becker/Braun, Kunststoffhandbuch, Vol. 7: Polyurethane, Carl Hanser Verlag, Munich, Vienna 1993, Pages 174 ff.).

Figure 3:
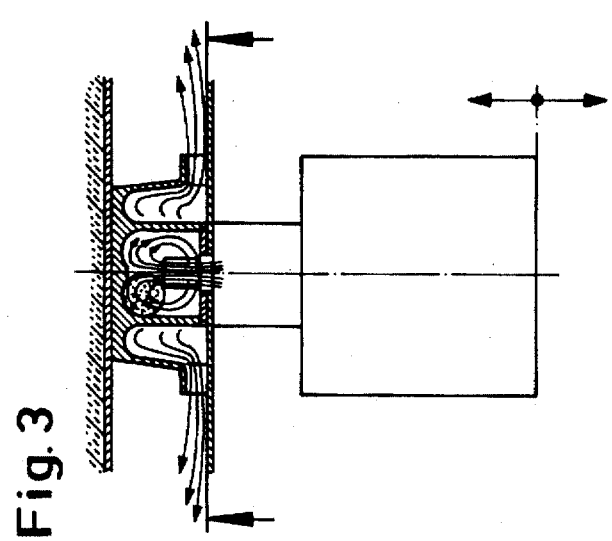
Figure 2:
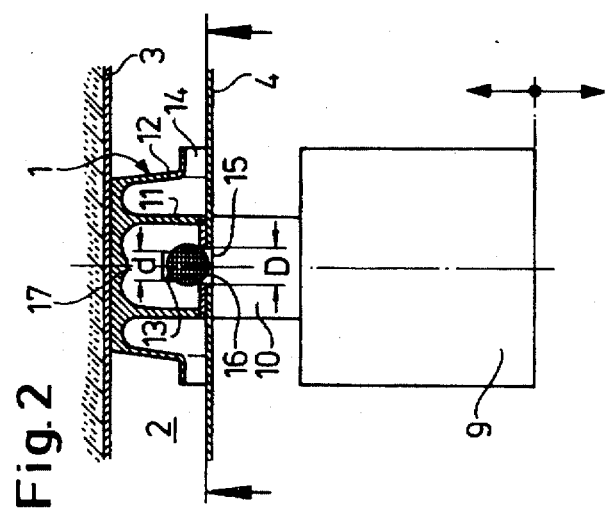

FIG. 2 shows the valve 1 according to the invention with the mixing head 9 of FIG. 1 in enlarged form. Reference numbers used in FIG. 1 denote the same elements. The valve 1 consists of an inner cage 11 and an outer cage 12 with a radial passage opening 13 through the inner cage and a radial passage opening 14 through the outer cage, and of the axial inlet opening 15 into the inner cage 11. Located within the inner cage 11 is the closing ball 16, which has a diameter greater than the diameter of the inlet opening 15 (D) and greater than the smallest cross-sectional diameter of the radial passage opening 13($d$), so that the ball 16 cannot pass out of the inner cage. Additionally, on the side opposite to the inlet opening 15 the cage 11 has a convex surface 17 which is directed inward so that, under the pressure of the inflowing reactive mixture, the ball 16 assumes a position outside the valve axis (FIG. 3). In the embodiment example depicted, the radial passage opening 14 through the outer cage 12 is additionally formed as a flow channel.

To fill a refrigerator casing with foam, the valve 1 is first fixed to the inside of the refrigerator outer casing through a hole in the outer casing which corresponds to the inlet opening 15 of the valve. Provided that the dimension of the valve 1 in the axial direction is the same as the distance between the outer casing 4 and the inner casing 3, a double-sided adhesive strip or similar item can be used for fixing the valve in position. The outer casing of the refrigerator is then placed on the base plate 7 (FIG. 1 ), the inner casing of the refrigerator is fitted, followed by the side plates 6 and the support core 5 of the support form. The mixing head 9, together with the outlet tube 10, is then inserted into the opening 8 of the base plate 7 and pressed against the inlet opening 15.

Figure 5:
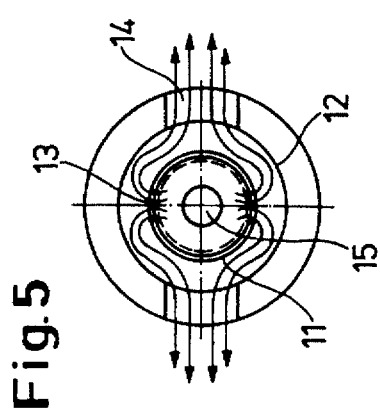
FIG. 5 shows a cross-section perpendicular to the valve axis in the plane of the inlet opening, in the operating state shown in FIG. 3.

FIG. 3 shows the operating state while the reactive mixture is flowing through the valve into the cavity. FIG. 5 shows a cross-section through the valve, perpendicular to the valve axis, in the plane of the inlet opening 15. The flow lines depicted illustrate the double deflection of the flow before the reactive mixture enters the cavity 2. Finally, FIG. 4 shows the operating state of the valve according to the invention following completion of the introduction of the foamable mixture 18 and expansion of the mixture. The mixing head 9 has been withdrawn from the inlet opening 15 and the ball 16 has closed the inlet opening 15.

A significant problem in the introduction of the foamable reactive mixture is the formation of flow dead-spaces in the inlet element. Entirely contrary to expectation, due to the positioning of the closing ball 16 outside the axis because of the convex surface 17, there were not observed any adverse effects on the foam which were to be anticipated due to the occurrence of flow dead-spaces. The ball 16 is apparently held in motion in the extra-axial position by the incoming flow of the reactive mixture in such a way that there is no formation of active flow dead-spaces in which premature hardening of the reactive mixture could occur.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A valve for use in introducing a foamable reactive mixture into a cavity, with the valve capable of being positioned within the cavity and when so-positioned is in contact with at least one of the walls of the cavity, with the valve comprising:

a) two essentially rotationally symmetrical coaxial cages, comprising an outer cage and an inner cage, said outer cage surrounding said inner cage, with the inner cage
   i) having an axial opening for the introduction of the reactive mixture and at least two radial openings for the passage of the reactive mixture into the annular space formed between the inner and the outer cage;
   ii) having a ball, capable of moving freely within said inner cage and capable of closing the inlet opening following completion of the introduction of the reactive mixture by falling downwards through gravity;
   iii) having a convex surface opposite said inlet opening, with said convex surface being directed inward, so that during the introduction of the reactive mixture the ball is positioned outside the inner cage axis and between said inlet opening and said convex surface; and
   b) with said outer cage having at least one radial opening for the passage of the reactive mixture from said annular space to said cavity, with the sizes of said axial opening and said radial openings being such that
   1) the total cross-sectional area defined by all of the radial openings in said inner cage is at least twice the cross-sectional area defined by said axial opening and
   2) the total cross-sectional area defined by all of the radial openings in said outer cage is at least twice the total cross-sectional area defined by all of the radial openings in said inner cage.

2. The valve of claim 1, wherein the radial openings of the inner cage and outer cage are disposed so that the reactive mixture flows through the annular space with at least two deflections.

3. The valve of claim 1, wherein the radial openings of the outer cage are formed as flow channels whose length in the direction of flow is at least equal to their shortest cross-sectional dimension.

* * * * *